United States Patent [19]

Ohtsuka

[11] Patent Number: 4,588,290
[45] Date of Patent: May 13, 1986

[54] ORIGINAL HOLDING PLATE HINGING MECHANISM

[76] Inventor: Yoshihiro Ohtsuka, 762-2, Aza-Asahidani, Niiharuchyou, Midori-ku, Yokohama-shi, Kanagawa-ken 227, Japan

[21] Appl. No.: 713,161

[22] Filed: Mar. 18, 1985

[30] Foreign Application Priority Data

Mar. 21, 1984 [JP] Japan ................................. 59-53917
Nov. 15, 1984 [JP] Japan ............................... 59-242082

[51] Int. Cl.$^4$ ..................... G03B 27/62; G03B 27/64
[52] U.S. Cl. ........................................ 355/76; 355/25
[58] Field of Search ............................. 355/25, 75, 76

[56] References Cited

U.S. PATENT DOCUMENTS

| | | | |
|---|---|---|---|
| 3,989,376 | 11/1976 | Ravera et al. | 355/75 |
| 4,110,041 | 8/1978 | Luperti et al. | 355/75 |
| 4,172,660 | 10/1979 | Yanofsky et al. | 355/75 |

*Primary Examiner*—Richard A. Wintercorn
*Attorney, Agent, or Firm*—George B. Oujevolk

[57] ABSTRACT

The present invention relates to an original holding plate hinging mechanism for a copying machine, a printing machine or the like. When a thick solid original, such as a book, needs to be covered with an original holding plate, the pivotal point of the original holding plate is raised so that the original holding plate is placed practically horizontally on the thick solid original when closed. The original holding plate hinging mechanism comprises a supporting member attached rotatably to a member of the copying machine, an original holding plate joined at the rear end thereof to the free end of the supporting member so as to turn relatively to the supporting member, and a resilient means interlocked with both a member of the copying machine and the supporting member to control the torque for turning the supporting member.

According to the present invention, the mechanism further includes a control means interlocked with both the supporting member and the original holding plate to control the turning motion of the original holding plate relative to the supporting member.

3 Claims, 24 Drawing Figures

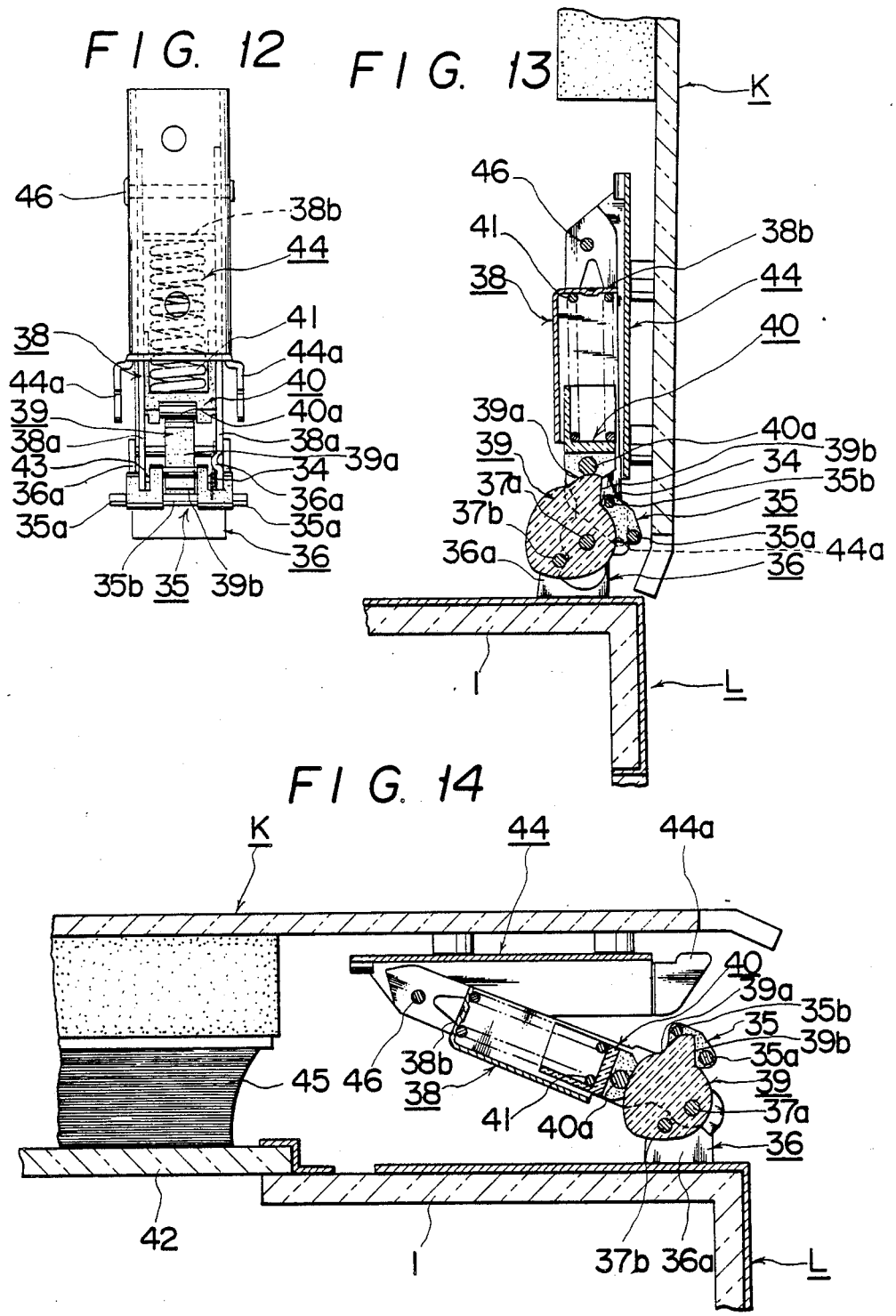

ORIGINAL HOLDING PLATE HINGING MECHANISM

BACKGROUND OF THE INVENTION

1. Field of the Invention

The present invention relates to an original holding plate hinging mechanism for a copying machine, a printing machine or the like.

2. Description of the Prior Art

A copying machine has a soft and flexible original holding plate, such as a rubber plate, or a hard original holding plate, such as a synthetic resin plate.

The former is capable of covering the upper surface of the original satisfactorily even if the original is a thick original such as a book. Therefore this flexible holding plate has less possibility of allowing external light to leak into the optical system disposed within the body of the copying machine, which secures making a clean copy to advantage. However, the flexible holding plate has disadvantages because the flexible holding plate is incapable of being held at a half-open position without any assistance, and hence is unsatisfactory in respect of accessibility in changing originals. Recently, the latter, namely, a hard original holding plate, which is capable of being held at a half-open position with a hinging mechanism, has become widely employed.

When holding a thick solid original, the latter, namely, the hard holding plate, is tilted against the original if the hard holding plate is hinged simply, hence the hard original holding plate is incapable of applying pressure uniformly to the original to press the same against the contact glass and shielding the optical system for external light. Accordingly, such a hard holding plate is hinged to the frame of the copying machine with a hinging mechanism including a lifting means so that the holding plate is placed practically in parallel to the surface of the original when closed.

This is shown in FIGS. 1 to 3. In one arrangement, a lifting means including a swing member 2 attached pivotally to a bracket 1 attached to the upper part of a copying machine frame A, a supporting member 3 attached pivotally to the swing member 2, a supporting frame 4 extending from the supporting member 3, and an original holding plate B supported pivotally practically at the middle of the opposite sides thereof on the supporting frame is, as shown in FIG. 1, large in size and has a disadvantage that the holding plate B is unsteady during opening and closing operation and moves laterally.

In another lifting means including a supporting member 6 attached pivotally to a bracket 5 attached to the upper part of a copying machine frame C, a lifting member 7 attached pivotally to the free end of the supporting member 6 so as to be rotatable in the same direction as the rotation of the supporting member 6, and an original holding plate D attached at one end thereof to the lifting member 7 has, as apparent from FIG. 2, disadvantages that the unstable lifting member 7 detriorates the accessibility of the holding plate D and the mechanism is unable to hold the holding plate D stably at the open position.

As shown in FIG. 3, a further lifting means including a supporting member 9 is attached pivotally to a bracket 8 attached to a copying machine frame so that the supporting member 9 turns reversely to the opening-closing direction of turning of a holding plate F, a lifting member 10 holding the holding plate F and attached pivotally to the free end of the supporting member 9, and a magnet 11 disposed to attract the free end of the supporting member 9 magnetically toward the copying machine frame E has disadvantages that reversing the supporting member 9 to place the holding plate F horizontally over a solid original needs a fairly large force if the magnetic attraction of the magnet 11 is excessively large, while the holding plate F is placed unstably if the magnetic attraction of the magnet 11 is insufficient, the magnet 11 needs to be strong and hence expensive, and the magnet 11 is subject to breakage.

SUMMARY OF THE INVENTION

Accordingly, it is an object of the present invention to provide
a holding plate hinging mechanism of a simple construction and satisfactory accessibility, and capable of holding the holding plate stably for opening-closing movement and placing the original holding plate horizontally over the solid placed on the contact glass so that the original holding plate will cover the solid original.

It is another object of the present invention to provide a holding plate hinging mechanism capable of lifting a holding plate within a fixed angular range of opening.

It is a further object of the present invention to provide a holding plate hinging mechanism capable of lifting a original, holding plate regardless of the angle of opening when the holding plate is in contact with a solid original.

The invention will become more fully apparent from the following detailed description thereof taken in conjunction with the accompanying drawings.

BRIEF DESCRIPTION OF THE DRAWINGS

FIG. 12 is a plan view of the mechanism of FIG. 11, in which only the lifting member is raised;

FIG. 13 is a fragmentary sectional side elevation of the mechanism of FIG. 11, in which the holding plate is opened;

FIG. 14 is a fragmentary sectional side elevation of the mechanism of FIG. 11, in which the mechanism is holding a solid original;

DESCRIPTION OF THE PREFERRED EMBODIMENTS

Figure 1:
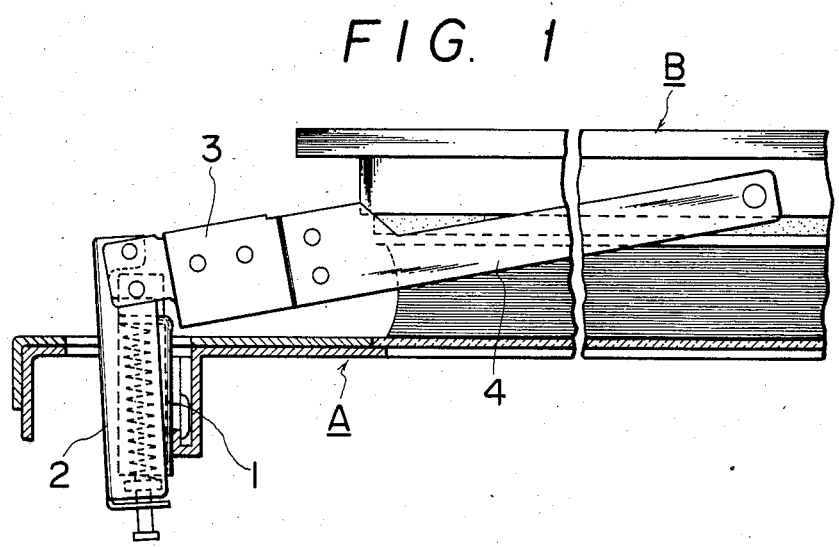
FIG. 1 is a fragmentary sectional side elevation of a holding plate hinging mechanism of the prior art.
Figure 2:
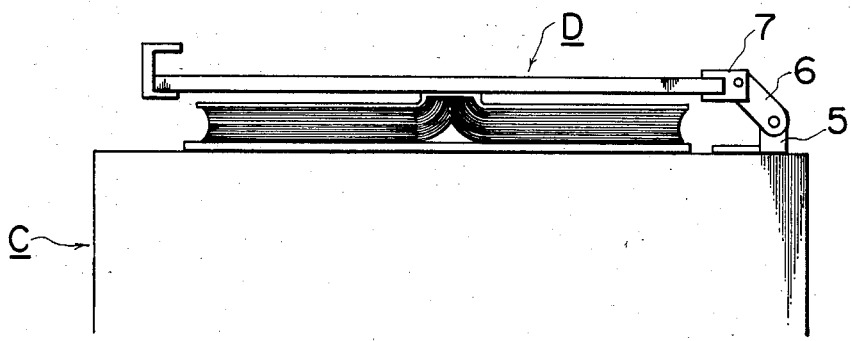
FIG. 2 is a side elevation of another holding plate hinging mechanism arrangement of the prior art.
Figure 3:
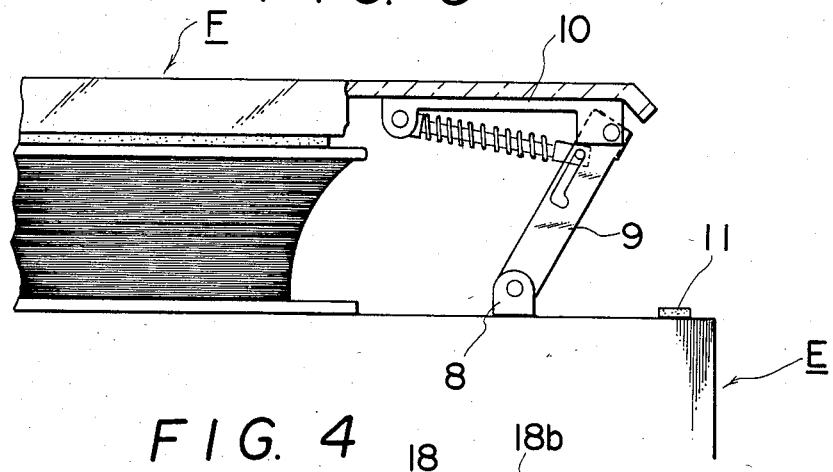
FIG. 3 is a side elevation of still another holding plate hinging mechanism of the prior art.
Figure 4:
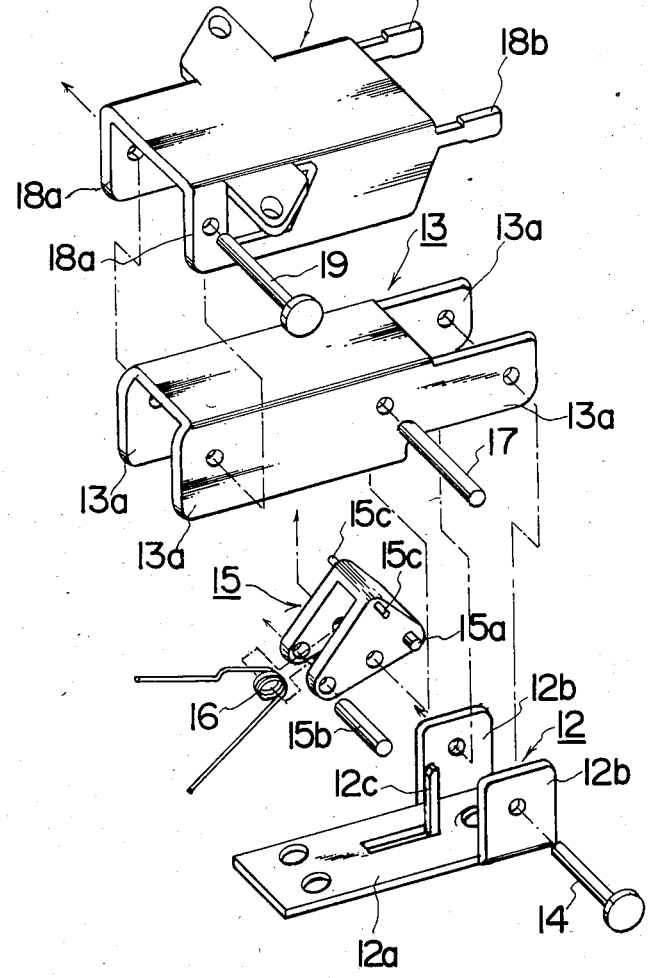
FIG. 4 is an exploded perspective view showing the essential section of an original holding plate hinging mechanism, in a first embodiment, according to the present invention.
Figure 5:
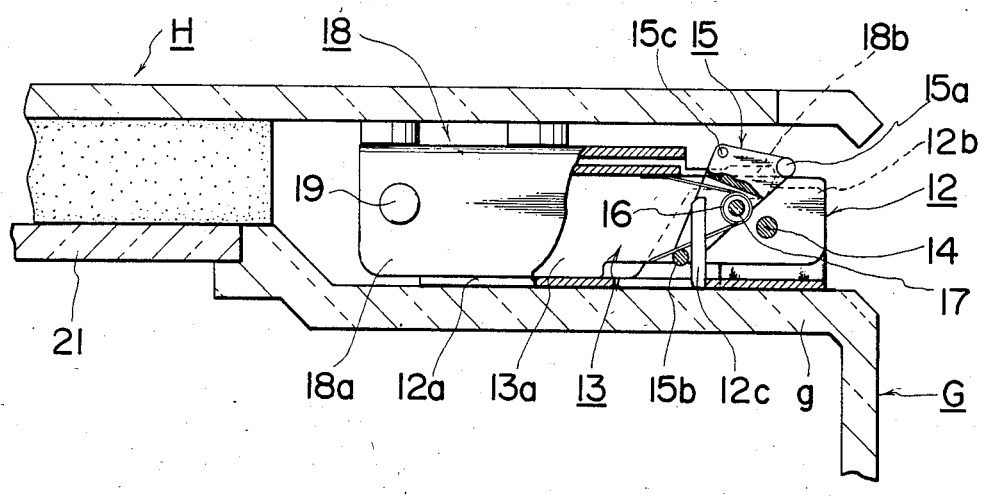
FIG. 5 is a fragmentary sectional elevation of a mechanism according to the present invention.
Figure 6:
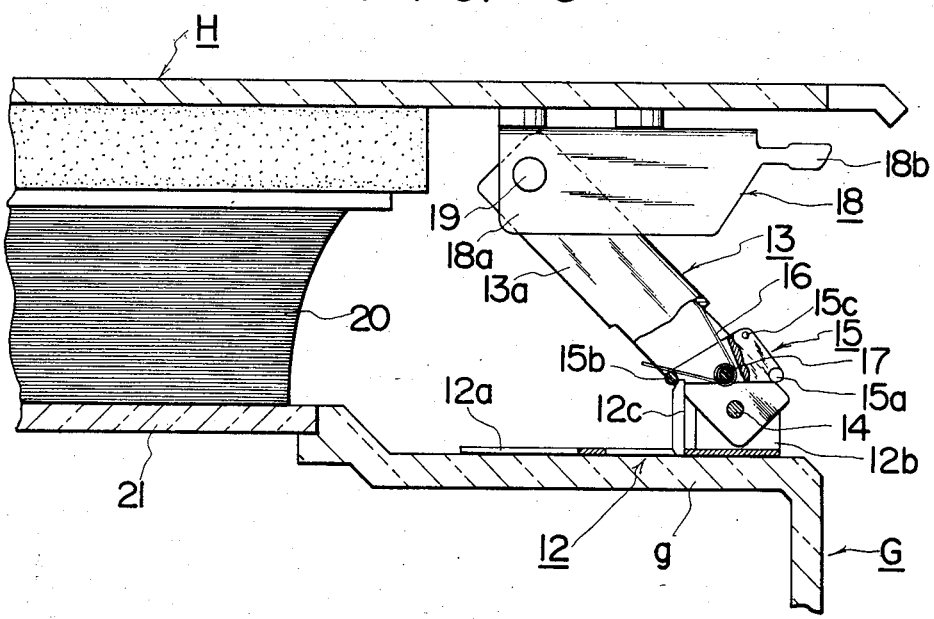
FIG. 6 is a sectional side elevation of the mechanism of FIG. 5, in which the mechanism is holding a solid original.
Figure 7:
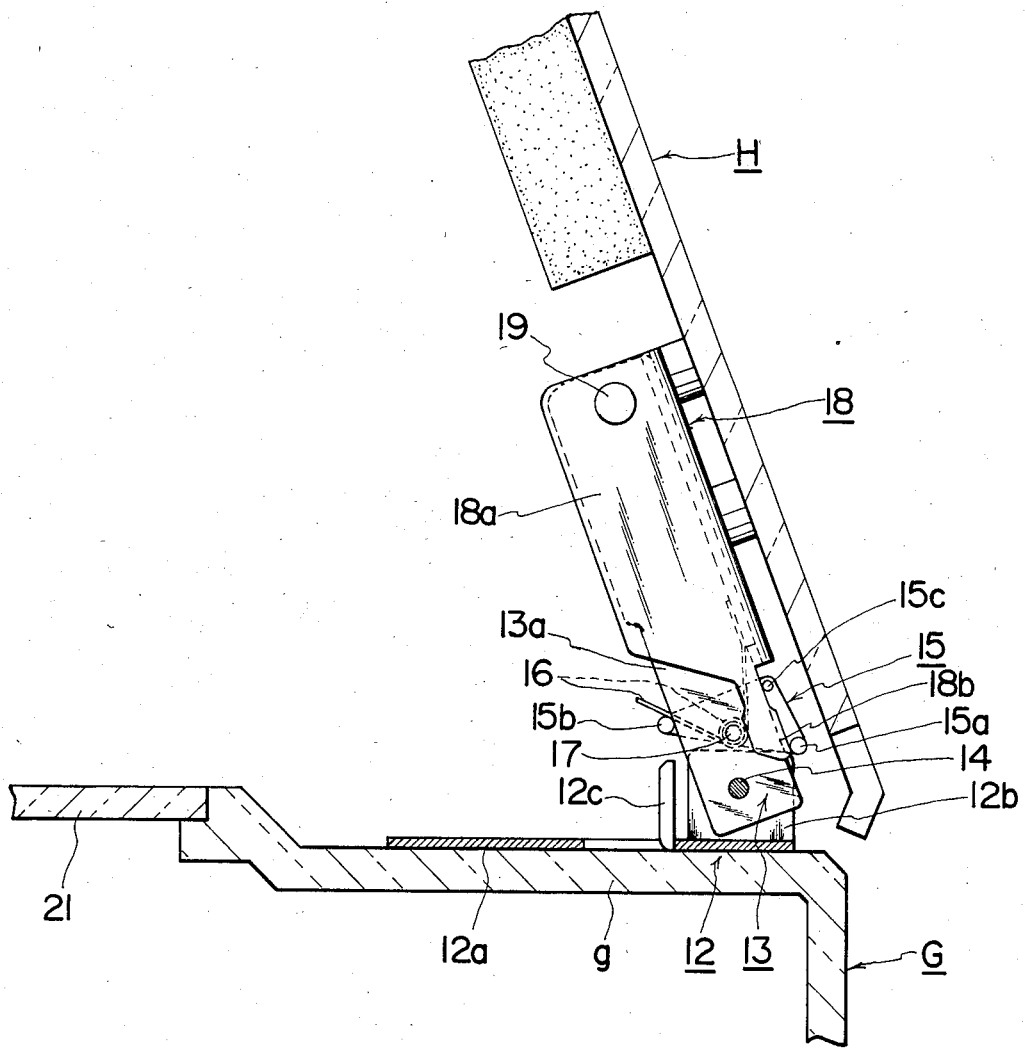
FIG. 7 is a sectional side elevation of the mechanism of FIG. 5, in which the holding plate is opened.

The present invention will be described in detail with reference to preferred embodiments thereof in conjunction with the accompanying drawings. Referring to FIGS. 4 to 7, a bracket 12 is attached to the upper plate g of a copying machine G. The bracket 12 has a base plate 12a, side plates 12b standing upright on both sides, respectively, of one end of the base plate 12a and a control piece 12c standing upright on the base plate 12a practically in the central portion thereof. The bracket 12 may be formed integrally with the copying machine G or may be formed separately and fixed detachably to the copying machine G with buttons or any suitable means. A supporting member 13 is attached rotatably to the side plates 12b at one end of each of the side plates 13a by means of a first hinge pin 14. A stopping member 15 is disposed between the side plates 13a of the supporting member 13 and attached rotatably to the supporting member by means of a pin 17 extending separately from the first hinge pin 14. The stopping member 15 is urged to the direction of the supporting member 13 by means of a spring 16. A pair of stopping pins 15a (only one of them is shown) project from both sides, respectively, of one end of the stopping member 15 and a pressure receiving pin 15b is attached to the other end of the stopping member 15. Stopping pins 15c projecting also from both sides of the stopping member 15 come into abutment with the upper edges of the side plates 13a to restrict the further turning of the stopping member 15 when the stopping member 15 is released from the control piece 12c and allowed to be turned by the resilient force of the spring 16 (FIG. 7).

A lifting member 18 is pivoted rotatably at the ends of the side plates 18a thereof on the free ends of the side plates 13a of the supporting member 13 by means of a second hinge pin 19. A pair of stopping projections 18b are formed in the respective free ends of the side plates 18a. A holding plate H is fixed at one end thereof to the lifting member 18.

When the free end of the holding plate H is lifted up for copying operation, the holding plate H turns together with the lifting member 18 and supporting member in a clockwise direction on the first hinge pin 14. After the holding plate H has been turned through a predetermined angle of opening (in this embodiment, 30 degrees), the stopping member 15 is released from the engagement of the control piece 12c and allowed to be turned in a counterclockwise direction by the resilient force of the spring 16, so that the stopping pins 15a engages the stopping projections 18b of the lifting member 18. The stopping pins 15a do not engage the stopping projections 18a Of the lifting member 18 until the holding plate H is turned for opening through the predetermined angle. Namely, the stopping pins 15a do not engage the stopping projections 18a of the lifting member 18 when the angle of opening of the holding plate H is smaller than the predetermined angle. However, since the holding plate H closes by itself by the agency of the dead weight thereof, the holding plate H does not tilt by turning together with the lifting member 18 in a counterclockwise direction on the second hinge pin 19.

According to the present invention, the lifting member 18 attached to the end of the holding plate H is brought into contact with the back of the supporting member 13 and is turned together with the supporting member 13 on the first hinge pin 14 when the holding plate H is opened, and after the holding plate H has been opened through a predetermined angle, the stopping member 15 released from the engagement of the control piece 13c is turned automatically in a counterclockwise direction by the spring 16, and thereby the stopping pins 15a engages the stopping projections 18b of the lifting member 18. Therefore, the holding plate H is not allowed to turn together with the lifting member 18 in a counterclockwise direction on the second hinge pin 19 when the holding plate H is closed, and hence the original holding plate H closes smoothly. After the holding plate H has been closed to a fixed angle of opening (approximately 30 degrees), the holding H and the lifting member 18 turns together even if the stopping member 15 and the lifting member 18 are not in engagement and the holding plate H closes of itself smoothly as described above by the agency of the dead weight thereof without causing any problem in the accessibility of the holding plate H.

When a thick solid original 20, such as a book, is to be placed on the contact glass, after opening the holding plate H and placing the solid original 20 on the contact glass 21 of the copying machine G, the holding plate H is closed. In this case, the pressure receiving pin 15b of the stopping member 15 has been brought into contact with the control piece 12c and turned in a clockwise direction against the resilient force of the spring 16 and the stopping pins 15a have already been disengaged from the stopping projections 18b. Consequently, the holding plate H turns in a counterclockwise direction about a line of contact between the holding plate H and the corner of the solid original 20 and also relatively to the lifting member 18 on the second hinge pin 19, and thereby the holding plate H lies practically horizontally on the solid original 20 to cover the same as illustrated in FIG. 6. Accordingly, the internal exposure light will not leak outside the copying machine G or external light will not leak into the optical system of the copying machine G, so that the possibility of producing an unclear copy is reduced to the least extent and the solid original 20 is pressed unformly against the contact glass 21. When the stopping member 15 is adapted to engage or disengage from the lifting member 18 around an angle of opening of 30°, the holding plate H is able to hold almost all books of any thickness properly.

Figure 8:
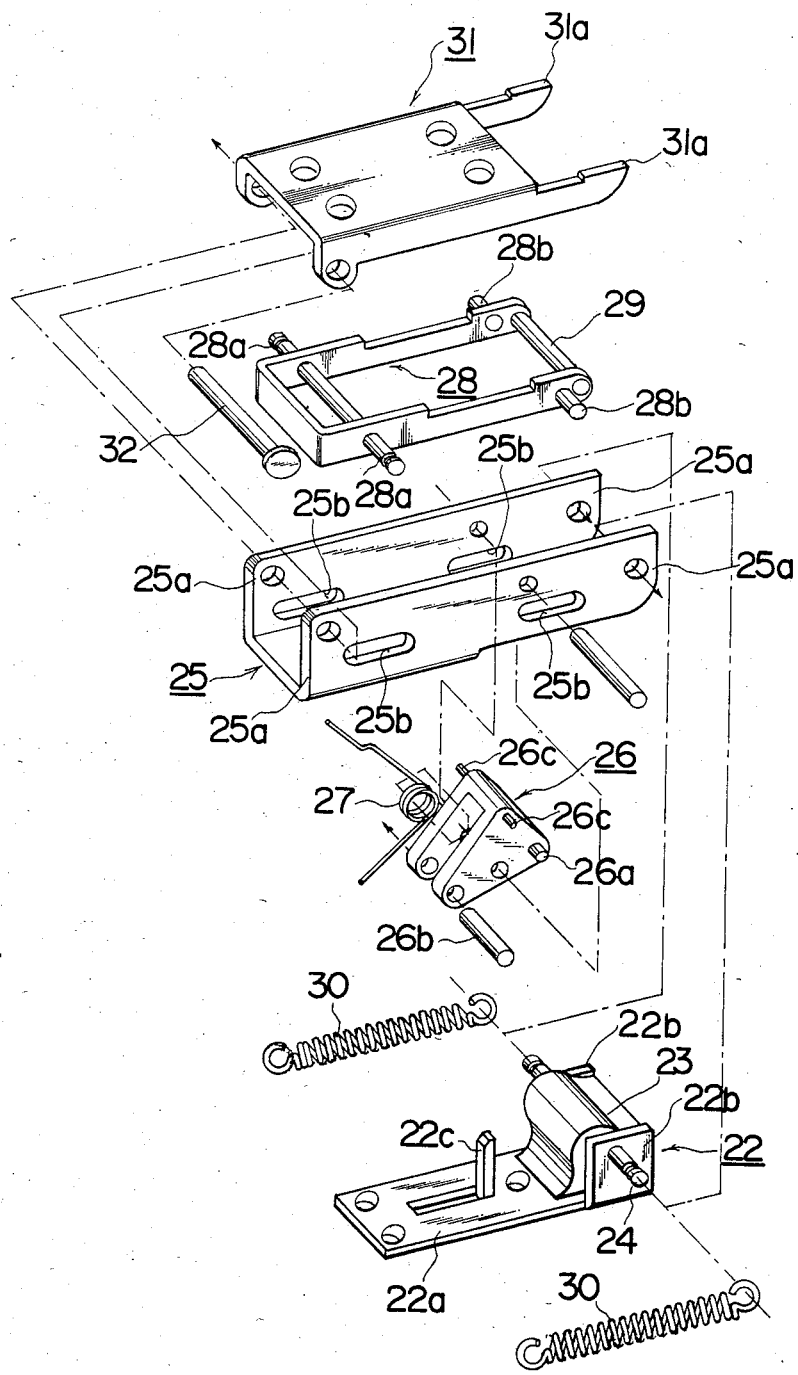
FIG. 8 is an exploded perspective view showing the essential section of a holding plate hinging mechanism, in a second embodiment, according to the present invention.
Figure 9:
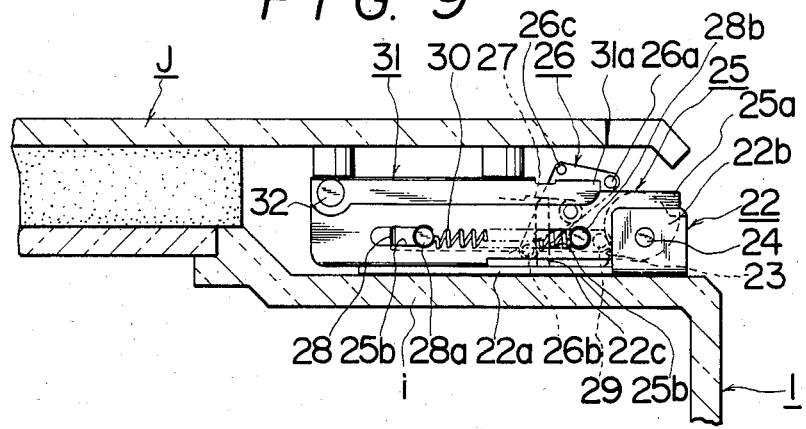
FIG. 9 is a fragmentary sectional side elevation of the mechanism of FIG. 8.
Figure 10:
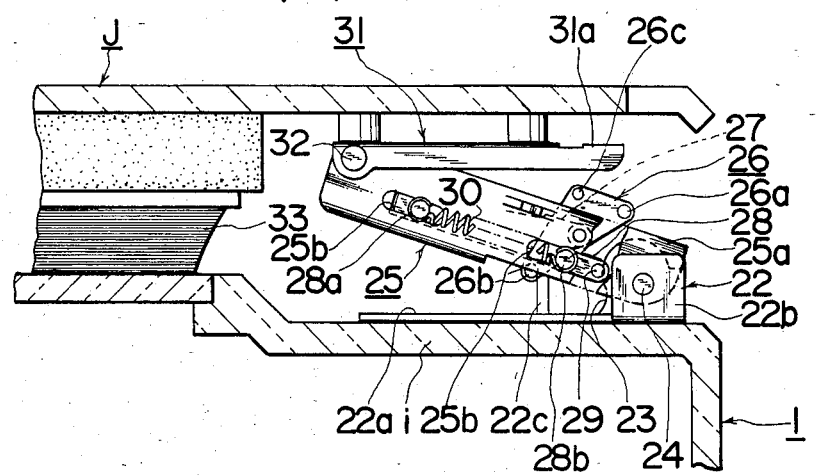
FIG. 10 is a fragmentary sectional side elevation of the mechanism of FIG. 8, in which the mechanism is holding a solid original.
Figure 11:
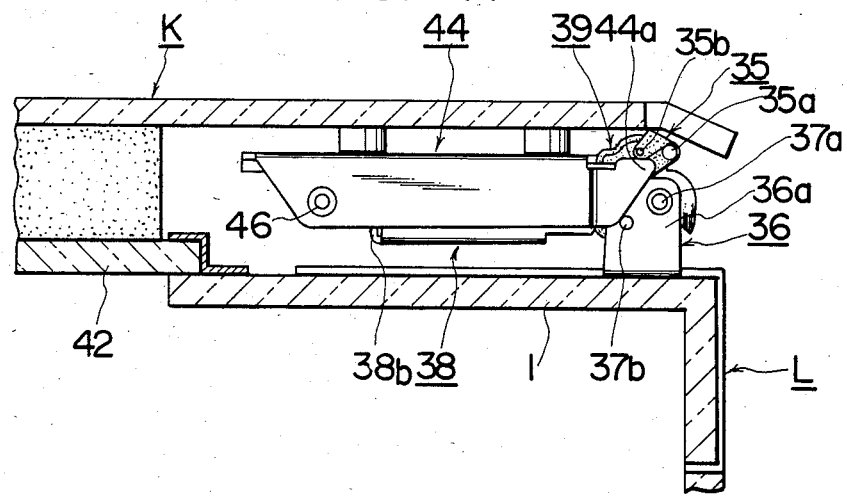
FIG. 11 is a fragmentary sectional side elevation of a holding plate hinging mechanism, in a third embodiment, according to the present invention.
Figure 15:
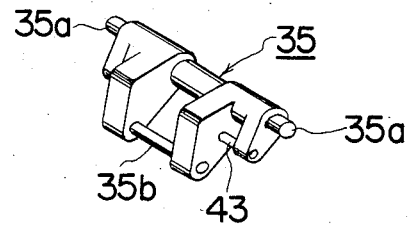
FIG. 15 is a perspective view of the stopping member of the mechanism of FIG. 11.

FIGS. 8 to 10 show a second embodiment of the present invention. In FIGS. 8 to 10, a bracket 22 having a base plate 22a, side plates 22b, and a control piece 22c is attached to the upper plate i of a copying machine I in the rear section of the same. A cam member 23 is disposed fixedly between the side plates 22b of the bracket 22 and receives a first hinge pin 24 therethrough. A supporting member 25 is pivotally connected to the bracket 22 with a first hinge pin 24.

A stopping member 26 having stopping pins 26a (only one of them is shown), a pressure receiving pin 26b and stopping pins 26c is disposed between the side plates 25a of the supporting member 25 and is urged in one direction with a spring 27. A U-shaped sliding member 28 is disposed slidably between the side plates 25a of the supporting member 25, with a pair of pins 28a and another pair of pins 28b projecting from the opposite sides of the opposite ends thereof respectively fitted in slots 25b formed in the side plates 25a of the supporting member 25. A control pin 29 is attached to one end of the sliding member 28 so as to be in contact with the cam member 23. Extension coil springs 30 are extended between the pins 28a of the sliding member 28 and the first hinge pin 24 to pull the sliding member 28 always toward the cam member 23. A lifting member 31 is pivotally connected to the free ends of the side plates 25a of the supporting member 25 with a second hinge pin 32. A holding plate J is attached at the rear end thereof to the lifting member 31.

The function of the stopping member 26 of the second embodiment is the same as that of the stopping member of the first embodiment. In the second embodiment, the cam member 23 and the extension coil springs 30 keeping the control pin 29 of the sliding member 28 in contact with the cam member 23 hold the holding plate J so that the original holding plate J will not close itself when the holding plate J is opened through and angle over a fixed angle of opening and the holding plate J will be urged rotatively in a closing direction to press the original against the contact glass.

When the angle of opening is smaller than the fixed angle of opening, the stopping projections 31a of the lifting member 31 are released from the stopping pins 26a of the stopping member 26 similarly to the same motion in the first embodiment, therefore, the original holding plate J is able to turn relatively to the solid original 33 to a horizontal position as shown in FIG. 10.

Furthermore, when the angle of opening is below the fixed angle of opening, the holding plate J is urged in the closing direction by the agency of the own dead weight, the extension coil springs 30, the cam member 23 and the sliding member 28, and hence the accessibility of the holding plate J during the closing motion is not deteriorated at all even if the stopping projections 31a of the lifting member 31 are released from the stopping pins 26a of the stopping member 26.

In a modification, the stopping member 26 may be provided outside of either both the side plates of the lifting member 31 or one of the side plates of the lifting member 31.

Referring to FIGS. 11 to 15 showing a third embodiment of the present invention, a bracket 36 having side plates 36a is attached to the upper plate 1 of a copying machine L at the rear section of the same and a cam member 39 is disposed between the size plates 36a of the bracket 36 and fixed by a first hinge pin 37a and a fixed pin 37b. A supporting member 38 is supported rotatably at one end thereof by the first hinge pin 37a. A sliding member 40 is disposed slidably between the side plates 38a of the supporting member 38. A compression coil spring 41 is placed compressively between the sliding member 40 and the end plate 38b of the supporting member 38 and a pressure receiving pin 40a attached to the sliding member 40 is pressed against the first cam section 39a of the cam member 39. A stopping member 35 is joined pivotally by means of a pair of pins 43 to the side plates 38a receiving the first hinge pin 37a therethrough and a torsion coil spring 34 is fitted on the pin 43 so as to turn the stopping member 35 in the counterclockwise direction. The stopping member 35 has a pair of stopping pins 35a and a pressure receiving pin 35b.

A lifting member 44 having at the free end thereof a pair of stopping projections 44a is attached rotatably to the free end of the supporting member 38 by means of a second hinge pin 46 so as to be rotatable in a direction reverse to the direction of rotation of the supporting member 38. A holding plate K is fixed at the rear end thereof to the back of the lifting member 44.

When the holding plate K is opened by an angle of opening over afixed of opening, the pressure receiving pin 40a of the sliding member 40 is pressed against the cam section 39a of the cam member 39 by means of the compression coil spring 41 so that the holding plate K is held stably.

When the angle of opening of the holding plate K is smaller than the fixed angle of opening, the holding plate K is urged rotatively so as to press the original against the contact glass 42.

The stopping member 35 turns on the first hinge pin 37a together with the supporting member 38.

The stopping member 38 also turns on the pins 43 through the pressure receiving pin 35b abutting to the second cam section 39b of the cam member 39. Thus, the stopping pins 35a of the stopping member 35 engage the stopping projections 44a provided at the free end of the lifting member 44 when the angle of opening of the holding plate K is over the fixed angle of opening, and release the stopping projections 44a when the angle of opening of the holding plate K is below the fixed angle of opening.

As shown in FIG. 14, when a solid original 45 is placed on the contact glass 42, the holding plate K can be turned so as to be place horizontally on the upper surface of the slide original 45. When the angle of opening of the holding plate K is below the fixed angle of opening, the holding plate K is urged rotatively in the closing direction by the agency of its own dead weight, the cam member 39, the resilient force of the compression coil spring 41 and the sliding member 40. Therefore, the holding plate K can be closed smoothly even if the stopping projections 44a of the lifting member 44 are released from the stopping pins 35a of the stopping member 35, and hence there is no possibility of the accessibility of the holding plate K being deteriorated by the accidental tilting of the same.

In any one of the above-mentioned embodiments of the present invention, the means to urge the stopping member 35 rotatively in one direction need not necessarily be a spring, but may be an unbalanced weight.

Furthermore, the stopping member 35 may be substituted by a spring which will urge the supporting member 38 rotatively toward the lifting member 44, by a magnetically attractive means which will cause the lifting member 44 to attract the free end of the supporting member 44 or by a combination of a spring and a magnetically attractive means. In this specification, the means including both the spring and the magnetically attractive means are designated as a control means. The bracket and the lifting member may be formed integrally with the frame of the copying machine and with the holding plate respectively, and claims 1 and 2 are provided to define such a constitution of the mechanism, and hence the present includes a mechanism in which the bracket and the lifting members are individual members or the bracket and the lifting members are formed integrally with the frame of the copying machine and with the holding plate respectively.

FIGS. 16 to 20 show a fourth embodiment of the present invention. Referring to FIGS. 16 to 20, a bracket 47 having opposite side plates 47a is attached detachably to the rear upper plate m of a copying machine M by means of a fastening button 48. The bracket 47 may be screwed to the rear upper plate m or may be formed integrally with the rear upper plate m. A supporting member 50 is supported rotatably at one end of each side plate 50a on one end of the bracket 47 by means of a first hinge pin 49. A lifting member 51 having opposite holding plates 51b is supported at the opposite side plates 51a thereof on the free end of the supporting member 50 by means of a pair of second hinge pins 52. The rear end of an original holding plate N is fixed to the holding plates 51b of the lifting member 51.

The lifting member 51 and the holding plate N may be formed in a unitary member. Crank members 53 are attached pivotally to the pivoted end of the lifting member 51 by means of a pair of pins 54. The crank members 53 are supported rotatably on the second hinge pins 52. The crank members 53 may be formed integrally with the lifting member 51 or with the holding plate N. A stretchable guide member 57 is extended between a pair of pressure receiving pins 55 attached each to the crank member 53 at a position opposite the pin 54 with respect to the second hinge pin 52 and a fixed pin 56 provided on the bracket 47. A compression coil spring 58 is fitted on the guide member 57 so as to extend resiliently between the pressure receiving pins 55 and the fixed pin 56.

Figure 16:
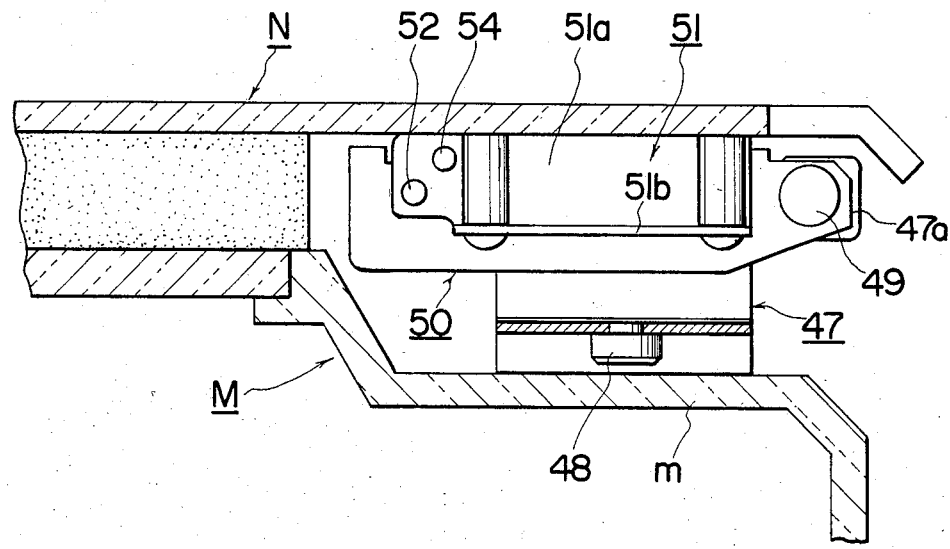
FIG. 16 is a fragmentary sectional side elevation of an original holding plate hinging mechanism, in a fourth embodiment, according to the present invention.
Figure 17:
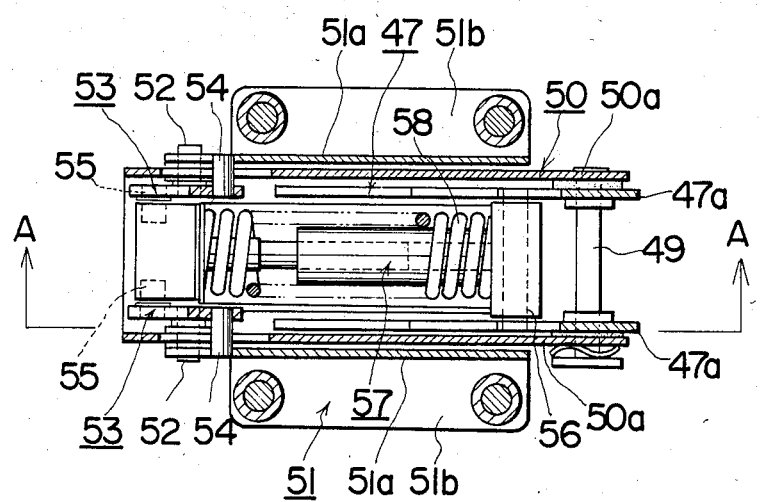
FIG. 17 is a sectional plan view of the mechanism of FIG. 16.
Figure 18:
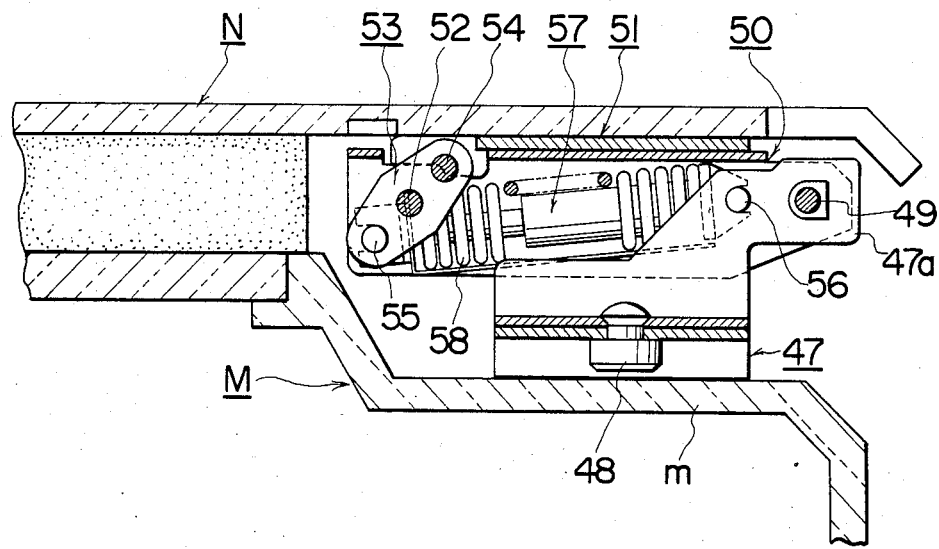
FIG. 18 is a sectional view taken on line A—A in FIG. 17.
Figure 19:
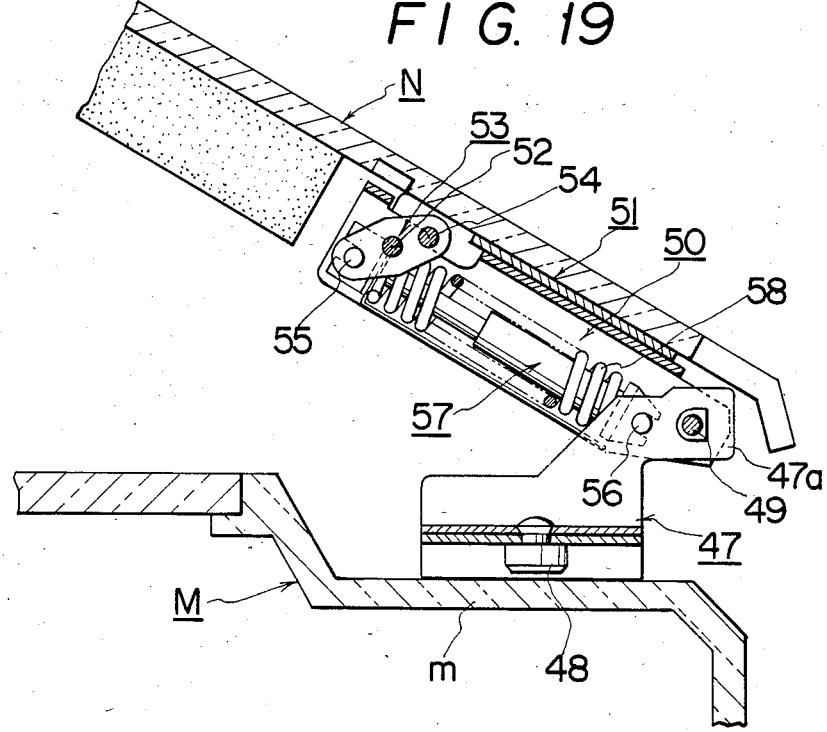
FIG. 19 is a sectional side elevation of the mechanism of FIG. 16, in which the holding plate is opened.

A shown particularly in FIGS. 16 to 18, when the holding plate N is closed, the supporting member 50 and the lifting member 51 are folded with respect to the bracket 47. When the holding plate N is opened from the closed condition, since the back of the lifting member 51 is contiguous with the back of the supporting member 50, the holding plate N turns together with the supporting member 50 on the first hinge pin 49. As the holding plate N is opened further, the distance between the fixed pin 56 and the pressure receiving pins 55 increases, and thereby the guide member 57 expands longitudinally and the resilient force of the compression coil spring changes. Consequently, the holding plate N stops at a position where the torque of the holding plate N about the first hinge pin 49 is balanced with the counteracting torque about the first hinge pin 49 produced by the compression coil spring 58 and, as shown particularly in FIG. 19, is stably held in an intermediate opening angle. The range of angle of opening allowing the stable retention of the holding plate N at an intermediately open position is expanded by the frictional rotary engagement of the corresponding parts of the bracket 47 and the supporting member 50.

The holding plate N seems to turn counterclockwise together with the lifting member 51 when left open without being held by hand. However, the holding plate N and the lifting member 51 remain at the same position relative to the supporting member 40, since the holding plate N and the lifting member 41 are urged in a clockwise direction by the resilient force of the compression coil spring 58 acting on the pressure receiving pins 55 each provided on one end of the crank member 53 which turns together with the lifting member 51.

As the angle of opening of the holding plate N increases, the torque of the holding plate N about the first hinge pin 49 decreases. After the holding plate N has been opened through an angle over a fixed angle of opening, the counteracting torque produced by the resilient force of the compression coil spring 58 exceeds the torque of the holding plate N and the compression coil spring 58 tends to spring up the holding plate N. This embodiment is designed to reduce the resilient force of the compression spring 58 to zero after the angle of opening of the holding plate N has increased over an angle around 90 degrees.

When the holding plate N is closed, the compression coil spring 58 is compressed, and thereby a force tending to urge the holding plate N and the lifting member 51 rotatively in a counterclockwise direction about the hinge pins 52 works on the holding plate N. When the fully open holding plate N is pushed to close the same, since the resilient force of the compression coil spring 58 is small when the holding plate N is at the fully open position, the original holding plate turns slightly together with the lifting member 51 in a counterclockwise direction. However, the holding plate N and the lifting member 51 are pushed immediately back to the original position by the resilient force of the compression coil spring 58 through the crank members 53 so that the holding plate N and the lifting member 51 turn in unity with the supporting member 50 for closing motion.

Figure 20:
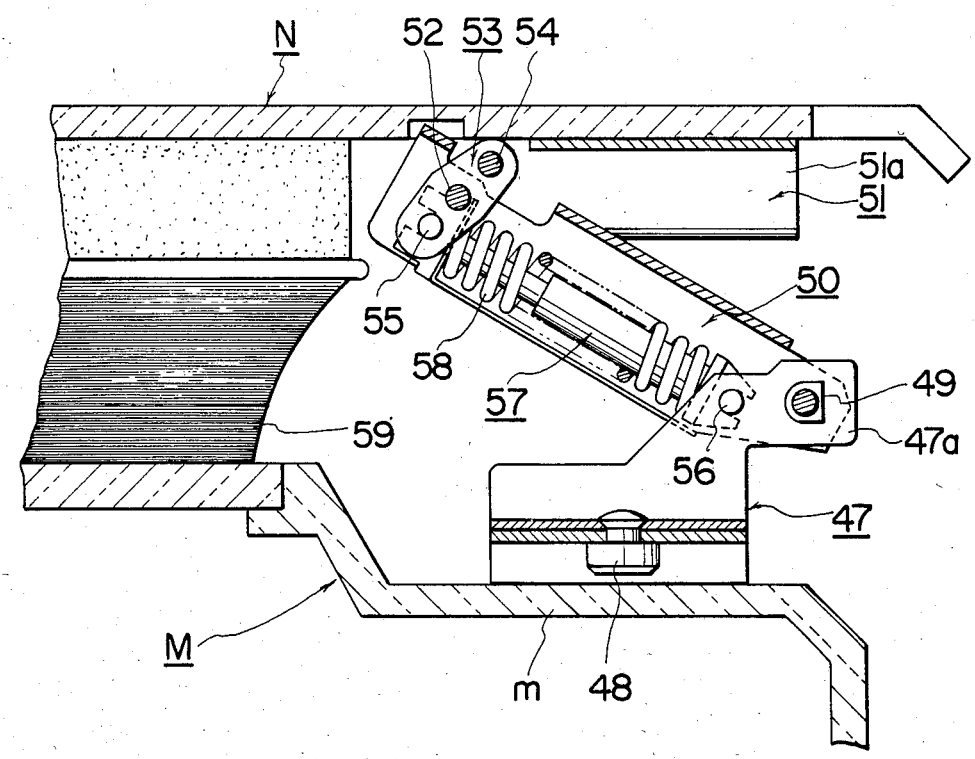
FIG. 20 is a fragmentary sectional side elevation of the mechanism of FIG. 16, in which the mechanism is holding a solid original.

As shown in FIG. 20, when a thick solid original 59, such as a book, is placed on the contact glass, part of the holding plate N first comes into contact with a corner of the solid 59 as the original holding plate N is closed, and then the application of a slightly increased pressure to the holding plate N at the free end thereof causes the holding plate N to turn in a counterclockwise direction on the second hinge pins 52, while the part of the holding plate N remains in contact with the corner of the solid 59. Finally, the original holding plate N is placed horizontally on the solid original 59 to cover the same. Accordingly, the internal exposure light will not leak outside the copying machine M or external light will not leak into the optical system of the copying machine M, and hence the possibility of producing an unclear copy is reduced to the lease extent.

According to this embodiment the range of counterclockwise turning of the holding plate is not limited by the thickness of the solid original 59. The original holding plate N is turned together with the lifting member 51 in a clockwise direction from the horizontal position to the original position, where the holding plate N, the lifting member 51 and the supporting member 50 are folded together, through the crank members 53 by the resilient force of the compression coil spring 58, when the force depressing the holding plate N at the free end thereof is removed or the solid original 59 is removed.

FIGS. 21 to 24 show a fifth embodiment of the present invention. Referring to FIGS. 21 to 24, a bracket 60 is fixed to the rear upper plate o of a copying machine O and a supporting member 61 is attached rotatably to the bracket 60 by means of a first hinge pin 62. A lifting member 63 is attached rotatably to the free end of the supporting member 61 by means of a second hinge pin 64. Projections p projecting from the holding plate P are fixed to the holding plate 63a of the lifting member 63 with screws 65. A crank member 66 is mounted rotatably on the second hinge pin 64. One end of the crank member 66 is joined to the lifting member 63 with a fixed pin 67 so that the crank member 66 will turn together with the lifting member 63. A stretchable guide member 69 is extended between a cam 66a formed in the crank member 66 and a pressure receiving pin 68 attached to the bracket 60 at a position different from that of the hinge pin 62 and a compression coil spring 70 is fitted on the guide member 69 so as to extend resiliently between the bracket 60 and the supporting member 61.

A torsion coil spring 71 is wound around the crank member 66 so as to engage torsionally with both the top plate 61a of the supporting member 61 and the fixed pin 67 fixed to the lifting member 61, to urge the holding plate P together with the lifting member 63 rotatably in a clockwise direction.

As apparent from FIGS. 21 and 22, when closed, the holding plate P is pressed against the contact glass 72 by the combined effect of the weight of the holding plate P and the resilient force of the compression coil spring 70 acting along a line of action passing below the second hinge pin 64 when the holding plate P is closed.

As the holding plate P is opened, the distance between the pressure receiving pin 68 and the cam 66a of the crank member 66 increases, and hence the torque produced by the compression coil spring 70 decreases. However, since the torque of the holding plate P tends to turn the supporting member 61 in the closing it direction also decreases as the angle of the opening of the holding plate P increases, the holding plate P is held at an open position where those counteracting torques balance each other, and hence the holding plate P will not close itself even if it is not held by hand.

As the holding plate P is opened further, the torque produced by the compression coil spring 70 exceeds the torque of the holding plate P, so that the holding plate P is caused to fly back automatically.

On the other hand, if the original holding plate P is released free at a position where the conteracting torques produced by the holding plate P and the compression coil spring 70 balance each other, the holding plate P is restrained from turning counterclockwise, since the line of action of the resilient force of the compression coil spring 71 passes below the center of the second hinge pin 64 and the torsion coil spring 71 winding around the crank member 66 engages torsionally with the supporting member 61 and the lifting member 63. The same is true when the holding plate P is depressed at the free end thereof to close the holding plate P.

Figure 24:
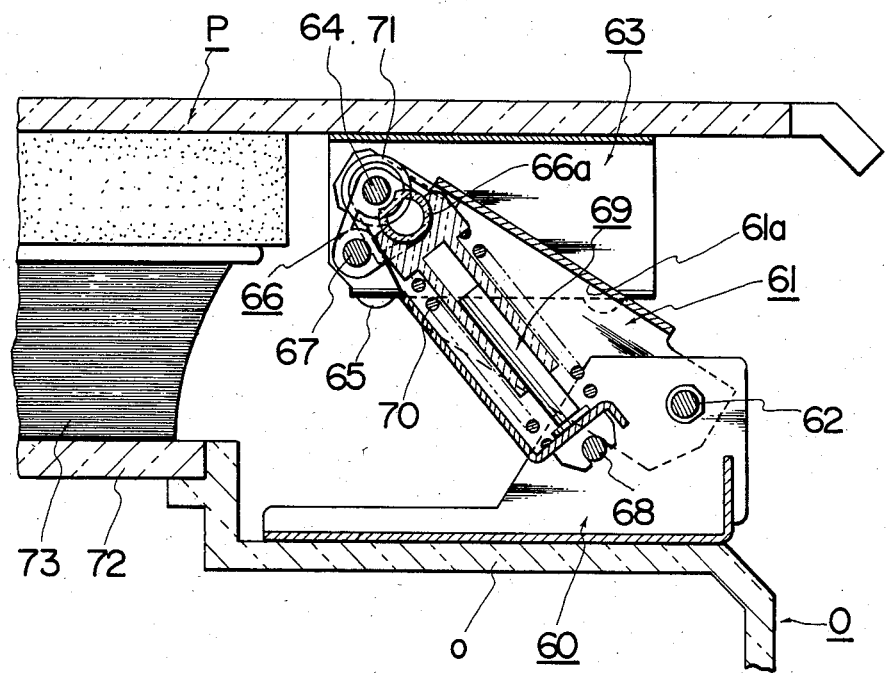
FIG. 24 is a fragmentary sectional elevation of the mechanism of FIG. 21, in which the mechanism is holding a solid original.

When a thick solid original 73, such as a book, is placed on the contact glass 72, the holding plate P comes in contact with a corner of the solid original 73 when moved in the closing direction. When a slightly increased pressure is applied to the holding plate P to close the same further, the original holding plate P turns counterclockwise about the corner of the solid original 73, against the resilient forces of the compression coil spring 70 and the torsion coil spring 71 until it is placed horizontally on the solid original 73 as illustrated in FIG. 24. Thus the solid 73 is covered satisfactorirly by the original holding plate P. Accordingly, the exposure light will not leak outside the copying machine or external light will not leak into the optical system of the copying machine, and hence the possibility of producing an unclear copy is reduced to the least extent.

Figure 21:
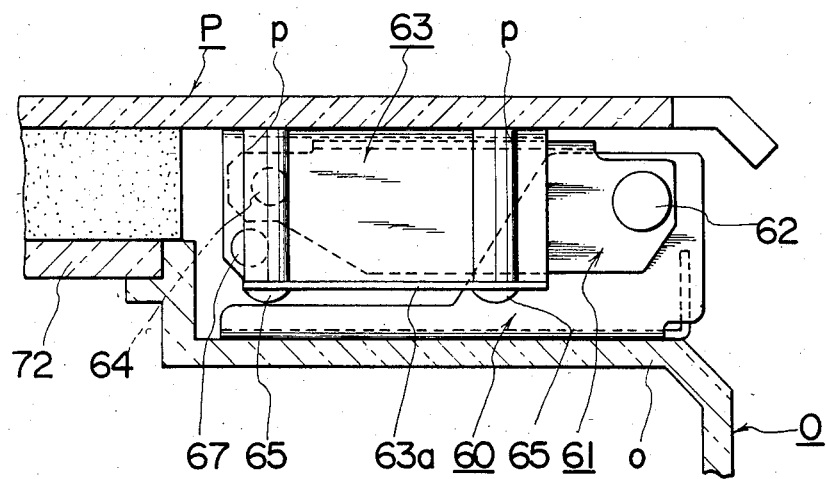
FIG. 21 is a fragmentary sectional view of a holding plate hinging mechanism, in a fifth embodiment, according to the present invention.
Figure 22:
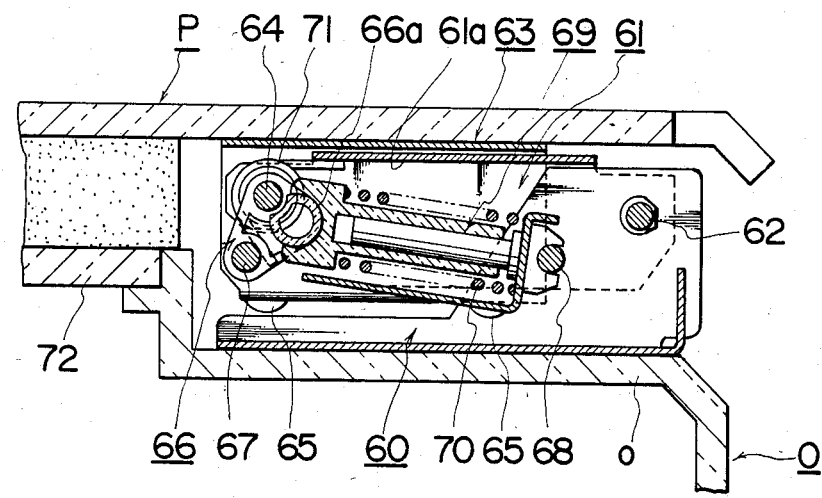
FIG. 22 is a sectional side elevation of the mechanism of FIG. 21.
Figure 23:
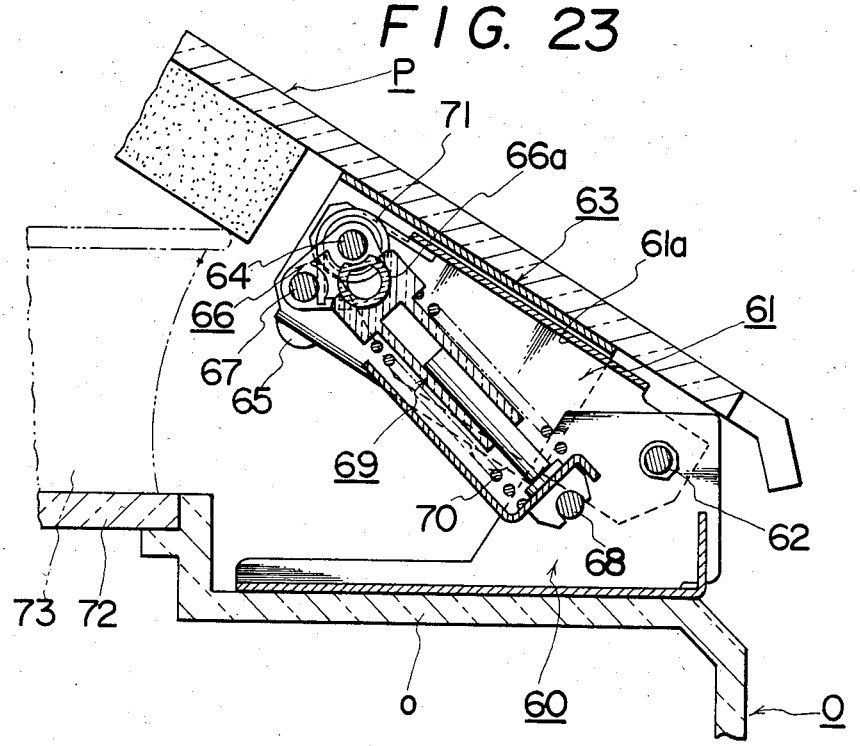
FIG. 23 is a sectional side elevation of the mechanism of FIG. 21, in which the holding plate is opened.

Thus, when the pressure is removed from the holding plate P or the solid original 73 is removed, the holding plate is returned automatically to the original position as shown in FIGS. 21 and 22 or in FIG. 23, by the resilient force of the torsion coil spring 71.

In this embodiment, the lifting member 63 may be urged rotatively in a clockwise direction only by means of the torsion coil spring 71 by omitting the compression coil spring 70 urging the lifing member 63 rotatively in a clockwise direction through the crank member 66, which will simplify the construction of the mechanism still further to advantage.

I claim:

1. A hinging mechanism for a holding plate of a copying machine which has an upper material support plate, comprising in combination:
    (a) a bracket (12) having a rectangular base plate (12a) with one end portion and a central portion, also side plates (12b) extending upright on both sides of said base plate end portion plus a control piece (12c) extending upright from said central portion;
    (b) a rectangular supporting member (13) sized to cooperate with the bracket (12), likewise with side plates (13a) having one end section, said one end section being hinged for rotation to the bracket side plates (12b) by a first pin (14), also a cam-like stopping member (15) with a narrow end and a cam end interposed between the supporting member side plates (13a), rotatably hinged thereto by a second pin, said stopping member defining a predetermined angle, said stopping member (15) cooperating with the control piece (12c), a spring (16) urging the stopping member (15) towards the supporting member (13) and away from the upper original material support plate, stopping pins (15a) projecting from both sides of the cam end and a pressure receiving pin (15b) projecting from the narrow end, said stopping pin (15a) abutting the edges of the supporting member side plates (13a) to control the turning of the stopping member (15);
    (c) a rectangular lifting member (18) with side walls (18a) sized to overlay the supporting member side plates, said side walls being hinged to said supporting member side plates at the end opposite said one end, stopping projections (18b) at the one end of said lifting member (18), a holding plate (H), with a fixed end and a free end, said holding plate being fixed to the lifting member (18) at the fixed end;
    whereby, when the free end of the holding plate (H) is lifted up for copying operation, the holding plate turns together with the lifting member (18) and supporting member in a clockwise direction on the first hinge pin (14), after the holding plate (H) has been turned through the predetermined angle, the stopping member (15) is released from engagement of the control piece (12c) and allowed to be turned in a counterclockwise direction by the resilient force of the spring (16) so that although the stopping pins (15a) engage the stopping projections (18b), the stopping pins do not engage the stopping projections until the holding plate is turned through the predetermined angle; when a thick material is placed on the copying machine, the pressure receiving pin (15b) has been brought into contact with the control piece (12c) and turned in a clockwise direction against the force of the spring (16) and the stopping pines (15a) have already been disengaged from the stopping projections (18b) so that the holding plate turns in a counterclockwise direction and lies substantially horizontally on the material to be copied to cover it.

2. A hinging mechanism for a holding plate of a copying machine which has an upper original support plate, comprising in combination:

(a) a bracket (22) having a rectangular base plate (22a) with one end portion and a central portion, also side plates (22b) extending upright on both sides of said base plate end portion plus a control piece (22c) extending upright from said central portion, a cam member (23) fixed between the side plates (22b) and extension coil springs (30) affixed to said cam member;

(b) a rectangular supporting member (25) sized to cooperate with the bracket (22), likewise with side plates (25a) having one end section, said one end section being hinged for rotation to the bracket side plates (22b) by a first pin (24), also a cam-like stopping member (26) with a narrow end and a cam end interposed between the supporting member side plates (25a), rotatably hinged thereto by a second pin, said stopping member defining a predetermined angle, said stopping member (26) cooperating with the control piece (22c), a biasing means (27) urging the stopping member (26) towards the supporting member and away from the upper original material support plate, stopping pins (26a) projecting from both sides of the cam end and a pressure receiving pin (26b) projecting from the narrow end, said stopping pin abutting the edges of the supporting member side plates to control the turning of the stopping member;

(c) a U-shaped sliding member (28) with a control pins (29) at one end said sliding member being disposed between the side plates said coil springs (30) keeping the control pin (30) in contact with the cam member (23);

(d) a rectangular lifting member (31) with side walls (31a) sized to overlay the supporting member side plates, said side walls being hinged to said supporting member side plates at the end opposite said one end, stopping projections at the one end of said lifting member, a holding plate, with a fixed end and a free end, said holding plate being fixed to the lifting member at the fixed end;

whereby, when the free end of the holding plate is lifted up for copying operation, the holding plate turns together with the lifting member and supporting member in a clockwise direction on the first hinge pin, after the holding plate has been turned through the predetermined angle, the stopping member is released from engagement of the control piece and allowed to be turned in a counterclockwise direction by the resilient force of the spring so that although the stopping pins engage the stopping projections, the stopping pins do not engage the stopping projections until the holding plate is turned through the predetermined angle; when a thick material is placed on the copying machine, the pressure receiving pin has been brought into contact with the control piece and turned in a clockwise direction against the force of the spring and the stopping pins have already been disengaged from the stopping projections so that the holding plate turns in a counterclockwise direction and lies substantially horizontally on the material to be copied to cover it.

3. A hinging mechanism for a holding plate of a copying machine which has an upper original material support plate, comprising in combination:

(a) a bracket having a rectangular base plate with one end portion and a central portion, also side plates extending upright on both sides of said base plate end portion plus a control piece extending upright from said central portion;

(b) a rectangular supporting member sized to cooperate with the bracket, likewise with side plates having one end section, said one end section being hinged for rotation to the bracket side plates, also a triangular stopping member with a narrow end and a base end interposed between the supporting member side plates, rotatably hinged thereto, said stopping member defining a predetermined angle, said stopping member cooperating with the control piece, biasing means urging the stopping member towards the supporting member and away from the upper original material support plate, stopping means projecting from both sides of the base end and a pressure receiving pin projecting from the narrow end, said stopping pin abutting the edges of the supporting member side plates to control the turning of the stopping member;

(c) a rectangular lifting member with side walls sized to overlay the supporting member side plates, said side walls being hinged to said supporting member side plates at the end opposite said one end, stopping projections at the one end of said lifting member, a holding plate, with a fixed end and a free end, said holding plate being fixed to the lift member at the fixed end.

* * * * *